United States Patent [19]

Britz

[11] Patent Number: 5,790,291
[45] Date of Patent: Aug. 4, 1998

[54] BEAM STEERING AND TRACKING OF LASER COMMUNICATION LINKS BY DUAL-QUADRANT TRACKER AND PHOTODIODE ASSEMBLY

[75] Inventor: David Michael Britz, Rumson, N.J.

[73] Assignee: Lucent Technologies Inc., Murray Hill, N.J.

[21] Appl. No.: 569,024

[22] Filed: Dec. 7, 1995

[51] Int. Cl.⁶ .................................................. H04B 10/00
[52] U.S. Cl. ...................... 359/159; 359/152; 359/113; 359/172; 379/56; 250/206.1
[58] Field of Search ........................ 359/113, 143, 359/152, 159, 172; 379/56; 455/151.2; 356/139.6, 141.3, 152; 250/203.1, 206.1, 206.2

[56] References Cited

U.S. PATENT DOCUMENTS

| | | | |
|---|---|---|---|
| 4,867,560 | 9/1989 | Kunitsuzo | 359/159 |
| 4,910,395 | 3/1990 | Frankel | 250/203.3 |
| 4,918,675 | 4/1990 | Lee | 369/13 |
| 4,924,507 | 5/1990 | Chao et al. | 382/31 |
| 4,987,292 | 1/1991 | Howard | 250/201.5 |
| 5,060,304 | 10/1991 | Solinsky | 359/159 |
| 5,150,348 | 9/1992 | Fujita | 369/44.41 |
| 5,321,542 | 6/1994 | Freitas et al. | 359/172 |
| 5,351,224 | 9/1994 | Nagata et al. | 369/44.29 |
| 5,392,157 | 2/1995 | Shih | 359/625 |
| 5,406,543 | 4/1995 | Kobayashi et al. | 369/121 |
| 5,463,671 | 10/1995 | Marsh et al. | 379/56 |

OTHER PUBLICATIONS

Advanced Photonix, Inc., "Position Sensing Photodetectors", sheet pp. 32, 31 and 35.

*Primary Examiner*—Kinfe-Michael Negash
*Attorney, Agent, or Firm*—Christopher N. Malvone

[57] ABSTRACT

At the reception site of a laser transmission system the received laser light beam is converted into a focusing cone of light. The cone of light is directed to partially illuminate the inner area of the quad photo detector array which is used to provide a highly accurate positional measurement of the laser beam. A quad photo detector is utilized to measure deviation of the laser beam from its ideal line-of-sight and provide sensing signals defining the deviation to enable its corrective adjustment. A high speed photo detector located centrally to and behind a central aperture of the quadrant photo detector permits the detection of the laser light beam voice and data.

10 Claims, 3 Drawing Sheets

BEAM STEERING AND TRACKING OF LASER COMMUNICATION LINKS BY DUAL-QUADRANT TRACKER AND PHOTODIODE ASSEMBLY

FIELD OF THE INVENTION

This invention relates to the beam detection, steering and tracking of a line-of-sight, laser, full-duplex communication link, and in particular to a dual-quadrant tracker including a high speed photodiode assembly.

BACKGROUND OF THE INVENTION

Laser beams are increasingly being used as communication links for the transmission of data and voice signals. Such transmission arrangements must be line-of-sight transmissions given the straight line path followed by a laser beam. Since the laser beam is substantially collimate, it must be precisely directed along a line-of-sight path traversing a straight line from transmitter to receiver. Should the line-of-sight path shift slightly for any reason the communication is substantially impaired. It is desirable therefore to monitor the accuracy of alignment of this line-of-sight transmission and to make positional adjustments to maintain this alignment.

Monitoring of the accuracy of sighting of the laser beam may be attained by use of photo detectors at the focus of the receiver. Often a choice must be made between speed of response and the accuracy of position determination with the use of a single detector for position sensing and data reception. Often the position sensing photodetector and the signal sensing detector are physically separated to allow for electrical optimization of use of a the detectors. This arrangement typically requires the laser beam to be split into two separate beams, by an optical beam splitter(e.g., a prism), allowing each beam to be individually directed to the appropriate detector.

SUMMARY OF THE INVENTION

An optical assembly receives an incoming collimated laser beam and redirects the beam to a point of focus. The focusing cone of light is directed to a photo detector assembly consisting of a quadrant array photodetector, with individual photodetector in each of four quadrants located about an aperture and with a separate high speed photodetector located optically behind the aperture. The quadrant array photo detector, having a relatively slower high speed response, is provided to measure angular deviation of the laser beam from its ideal line-of-sight path and provide sensing signals defining the angular deviation to enable its corrective adjustment. The high speed photo detector, located centrally to and in the illustrative embodiment behind a central aperture in the quadrant array photo detector, permits the detection of the modulated signal contained within the laser beam.

Since the outer perimeter of the focusing cone of light intercepts illuminates the inner area (i.e., adjacent the aperture) of the four independent photodetector areas of the quad detector, positional information can be derived from light received in each quadrant. The remaining unobstructed beam continues on through the central hole to a point of focus on the surface of the high speed photodiode. Since this beam is now a focused spot it maximizes the signal-to-noise ratio of the system.

In an exemplary embodiment the reception and monitoring apparatus includes a quadrant photodetector with an aperture in its center. Behind the aperture is a high speed detector to receive the laser based voice and data transmission. An optical assembly converts the incoming laser beam into a converging cone of light which if properly directed equally illuminates the inner area of all four quadrants around the central aperture of the quad photo detector. The cone of light penetrating the aperture converges to focus and illuminates the high speed photodiode. By directing the incoming laser beam into a focusing cone the light illuminating the high speed photo diode is intensified providing an enhanced signal to noise ratio for the voice and data signal. Due to the quad detector and high speed detector being separate components, the differing material and electrical characteristics of the quadrant photo detector and the high speed detector can be optimized for maximum performance and rugged assembly.

DETAILED DESCRIPTION

Figure 1:
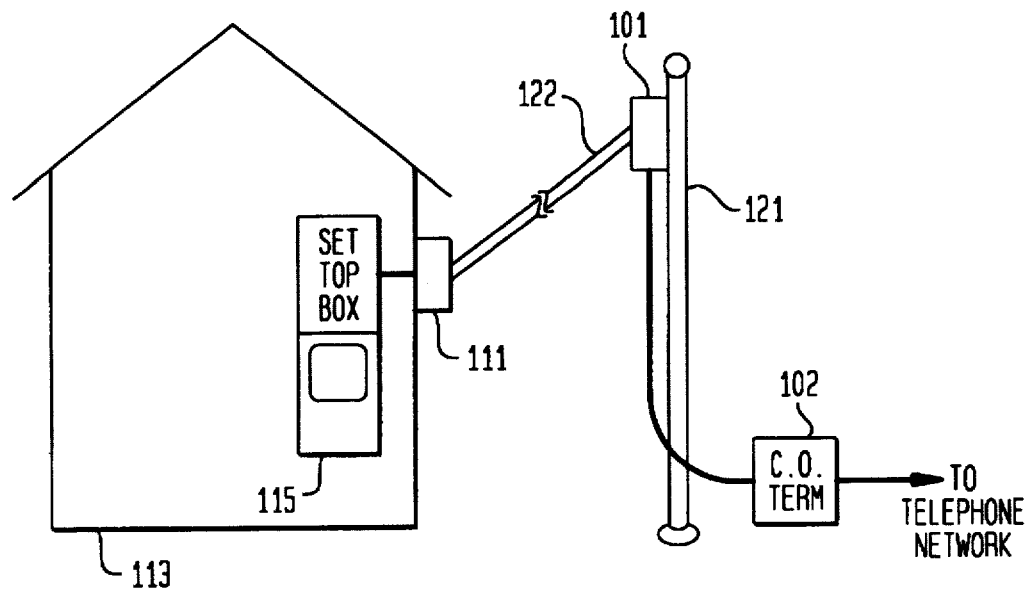
FIG. 1 is a pictorial schematic of a laser beam drop link from a telephone terminus to a residence.

An illustrative telephone system drop link utilizing a laser light beam is shown in FIG. 1 as including optical receptors and transmitters located at both a pole termination of the telephone network and a residence termination. The terminus of the telephone network includes an optical transmit-receive apparatus 101, mounted on a utility pole 121, and which is connected to a central office 102. An optical transmit-receive apparatus 111 is mounted on a residence within a line-of-sight path of a laser beam 122 from and to the transmit-receive apparatus 101. Transmit-receive apparatus 111 is coupled to communication equipment 115 located within the residence 113, which is illustratively shown as a TV system with a set-top box.

Figure 2:
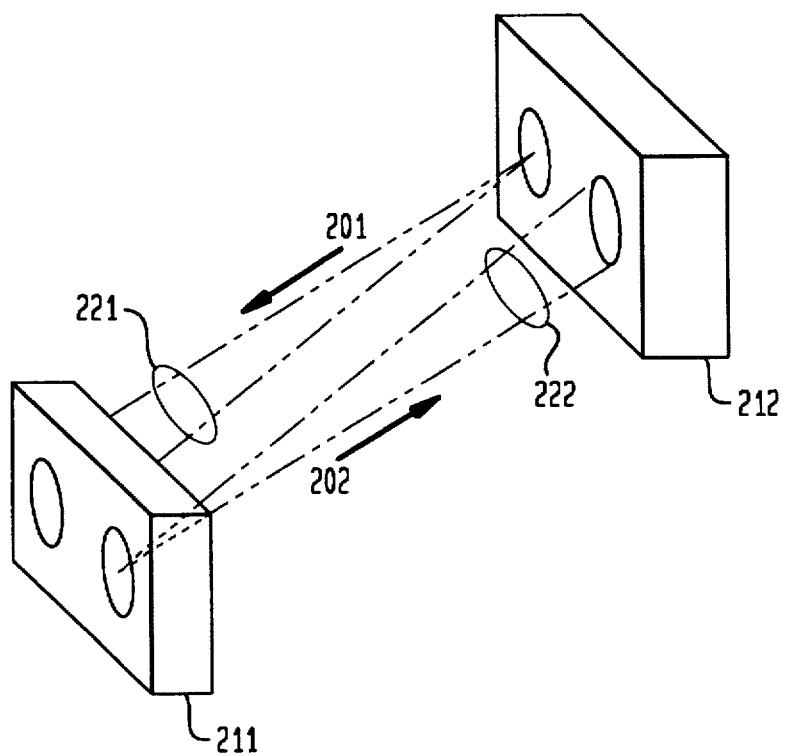
FIG. 2 is a schematic of a duplex arrangement of the laser beam drop link disclosed in FIG. 1.

The optical duplex two-way nature of the transmit-receive apparatus 101 and 112, using two isolated optical channels in the infrared spectrum, is shown in the FIG. 2 which shows two side-by-side transmission laser beam links 201 and 202, processed in each transmit-receive apparatus 211 and 212, operating in opposing directions and connecting two ends of the system. Transmission in one direction is at one infrared frequency. The detector at the same end receives the other infrared frequency. The far end of the system also detects and transmits at the two alternate frequencies. One end 212 is located at the pole termination and the far end 211 is located at the residence location some distance away. Each end of the system has transmitters and detectors physically isolated and separated from the other operating with the optical transmitted beams in opposing directions. The received beam at each end is filtered by notch filter devices 221 and 222 to eliminate only the infrared light of the other channel being emitted by the same end laser.

Figure 3:
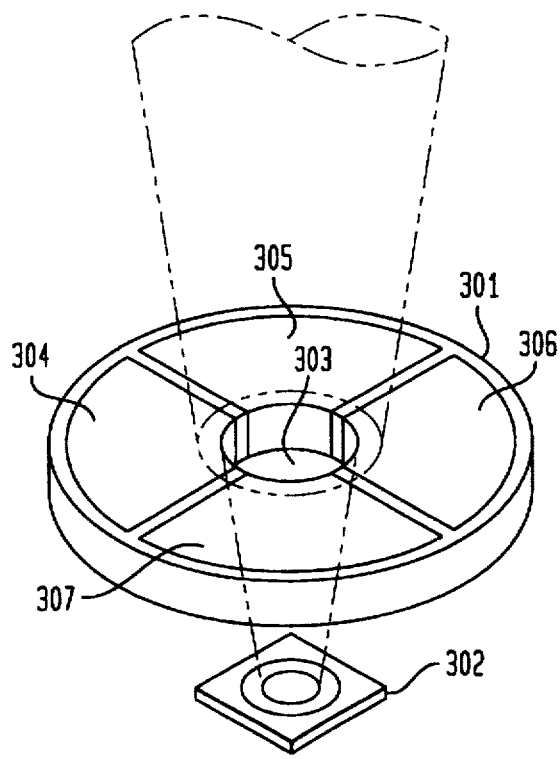
FIG. 3 is a schematic of a laser beam detector used in the drop link of FIG. 1.

A position sensitive arrangement combining a quad photo detector 301 and a high speed photo detector 302 is shown in an exploded view in the FIG. 3. The quad photo detector 301 has a central aperture 303 and four separate photodetector surfaces 304, 305, 306 and 307. Each photodetector surface 304–307 operates independently in responding to light intensity. Correct alignment of the converging cone of the laser beam occurs when each photo surface is illuminated to the same extent as the other three photo surfaces are. An imbalance of this beam illumination balance indicates that the beam is not properly positioned. The high speed photodetector 302 is located behind the aperture 303 to receive the information contained within the beam.

Figure 6:
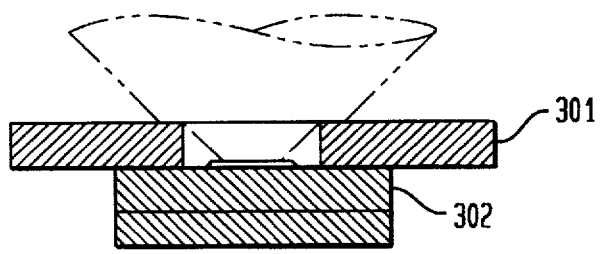
FIG. 6 is a cross-section view of the laser beam detector of FIG. 3.

A cross-section view of the detector of FIG. 3 is shown in FIG. 6. The high speed photo detector 302 is shown contiguous with the quad photo detector and located directly behind the aperture 303. As shown the cone of light illuminates the quad detector along the periphery of the aperture to provide the directional control. The light cone penetrating to the high speed photo detector provides the information transmission.

Figure 4:
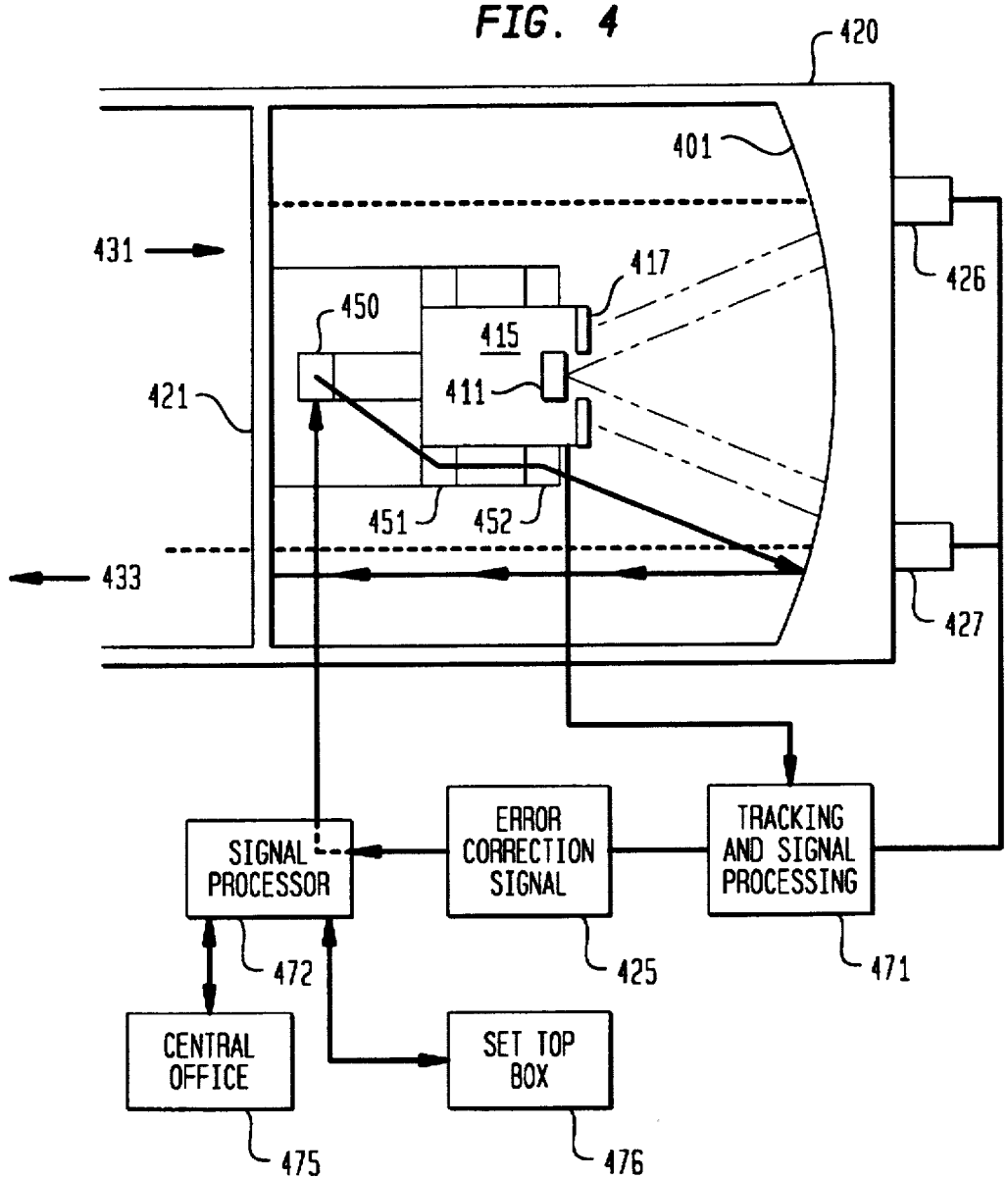
FIG. 4 is a cut-a-way cross-section side view of the tracker and steering assembly.

A reception apparatus for receiving an infrared laser beam is shown in the FIG. 4. An incoming collimated infrared laser beam is collected and brought to a focus by a spherical mirror 401 which focuses the laser light onto a photo diode detecting assembly 415 to receive the optically modulated voice and data signal. The overall optical assembly 420 includes a solar filter 421 at the input which transmits infrared and rejects visible light. Located within the assembly 420 is a concave reflecting mirror 401 located between the solar filter and mirror is the diode assembly member 415 supporting the quad photodetector 417 and the laser diode detecting surface 411. The incoming laser beam 431 is reflected by the mirror 401 into a cone of light impinging upon a quadrant tracking device 417 (such as shown in FIG. 3) so that all quadrants are equally illuminated if the beam is properly aligned. The quadrant detection electronics generates an amplitude and direction signal if the beam becomes misaligned. Both the laser diode detecting surface and the quadrant detector apply signals to a tracking and signal processing circuit 421 which separates the positional and the voice, data signals. Voice and data are sent to a signal processor 422 which in turn applies the information signals to the set top box (shown in FIG. 1).

Figure 7:
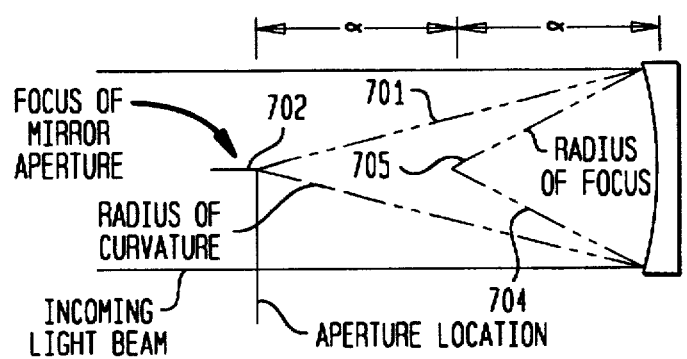
FIG. 7 is a line diagram of the focusing properties and the surface raditure of the mirror assembly of FIG. 4.

The geometry of the illustrative mirror may be ascertained by the line diagram of FIG. 7. The mirror radius is defined by line 701 which is rotated about the point 702. Reflections of collimated light of the mirror are shown by lines 704 focused on the focal point 705, which is at one-half the distance of the radius. As shown the focal point follows a curved surface 711 711 within which the focus is sharply defined as the collimated light moves off axis. The aperture to the mirror is located at the radius of curvature 702.

Identical optical tracking and signal processors, such as shown in FIG. 4, exist at both the near and far end. A track deviation detected at one end is sent to the opposing end to activate the activators 426 and 427 to realign the track. Tracking signals, detected by the quad photo detector, are applied, via a tracking and signal processor 471 and a signal processor 472, to an error correction circuit 425. An error signal is generated which through the return path laser beam 433 activates control of position actuators, corresponding the activators 426 and 427, at the far light link termination. The central office 475 is connected to the signal processor to provide voice and data. A set top box, such as shown in FIG. 1, is connected to the voice and data by the wireless light link interface. This arrangement of the actuators 426 and 427, which adjust positioning of the laser diode position detector at one end by controlling the position actuators at the far end, include an active error correction loop that will self-align each end of the system to each other. A small motion correction at the transmit end avoids the need for a big motion correction at the receive end. The system optical assemblies are advantageously assembled on a gimbal motion platform allowing rotation in the vertical and horizontal plane or any combination there-in. The mechanical rotation axis are positioned to be commonly centered with the spherical mirror's radius of curvature. This arrangement allows the focus spot to drift over the quad detector and high speed photo diode in a linear fashion associated with tracking error motion, the quad detector output can then precisely initiate positional corrections.

The return path laser 450 generates a laser beam and by utilizing suitable optical elements 451 and 452 collimates the laser light and directs the light around the quadrant and photo diode assembly, as shown by ray trace 455, and further redirects the light by these optical elements onto the objective mirror 401 at such varying angles of incidence that the objective mirror reflects the laser light out of the optical assembly as a collimated beam with an aperture equal to the mirror's diameter. The return path laser carries both the voice and data signals as well as the positional correctional signals to the far end's detectors and positional actuators.

Figure 5:
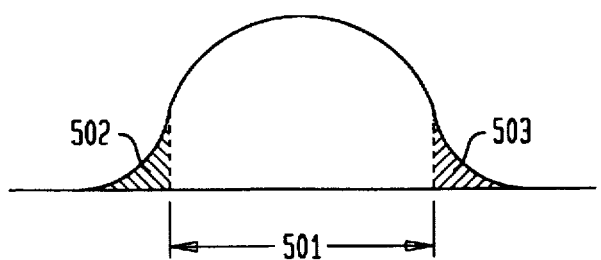
FIG. 5 is a graph of the energy distribution of illumination of the photo detector of the assembly of FIGS. 1 and 2.

The graph of FIG. 5 shows the light intensity Gaussian distribution at the surfaces of the high speed photo detector and quadrant detector which shows the maximum intensity occurs at the information detection region 501. The high laser light intensity at the high speed photo detector insures a high signal to interference ratio contributing to a reliable signal detection. Directional control information from the quad detector is derived from the light received in the regions 501 and 503.

While the illustrative embodiment has been disclosed using mirror focusing, it is to be understood that other beam converging systems using lenses may be used by those skilled in the art without departing from the spirit and scope of the invention.

The invention claimed is:

1. A columnar light beam reception system comprising:
    means for collimating the light beam;
    a position sensing detector for determining accuracy of the light beam alignment accuracy;
    a voice and data receptor located behind the position sensing detector for receiving the light beam and recovering voice and data information therefrom; and
    means responsive to the position sensing detector for actuating changes in position of the voice and data receptor to enhance the received light beam.

2. A columnar light beam reception system as claimed in claim 1, comprising:
    wherein the positioning sensing detector is fixed in spatial relation to the voice and data detector and
    the positioning sensing detector has a centralized aperture with the voice and data detector located behind the centralized aperture.
    wherein the means for collimating includes a light collimating device focused on the voice and data receptor.

3. A columnar light beam reception system as claimed in claim 2, comprising:
    wherein the light collimating device is a lens system.

4. A columnar light beam reception system as claimed in claim 2, comprising:

wherein the light collimating device is a mirror system.

5. A beam tracking and steering assembly for controlling line-of-sight laser communication links; comprising:

a light collector with a reflective surface for receiving and transmitting a collimated beam of light, and having a focal point defined by the reflective surface;

a quad detector assembly located to intercept light between the focal point and the reflective surface;

the quad detector assembly having a plurality of distinct photo detector arrays and an aperture located central to the photo detector arrays, a high speed photodetector located behind the aperture to receive light passing through the aperture; and means for responding to a mis-aligned beam as detected by the quad detector assembly.

6. A beam tracking and steering assembly for controlling line-of-sight laser communication links; as claimed in claim 3, comprising:

a notch light filter located to intercept light between the focal point and the reflective surface.

7. A beam tracking and steering assembly for controlling line-of-sight laser communication links; as claimed in claim 6, comprising:

means for admitting infrared light and blocking visible light from the light collector.

8. A method of beam tracking and steering of a line of sight communication signal laser beam;

comprising the steps of:

collimating the communication light beam;

transmitting the light beam to a reception system and creating a cone of light from the light beam;

determining directional accuracy of the beam by determining equality of illumination by the light cone of adjacent detectors divided into equal arc areas with an aperture central to the arc areas; and determining the information of the beam with a high speed photodetector located to receive the end of the cone behind the aperture.

9. A method of beam tracking and steering of a line of sight communication signal laser beam; as claimed in claim 8;

comprising the further steps of:

creating the cone of light by directing the collimated light into a curved mirror.

10. A method of beam tracking and steering of a line of sight communication signal laser beam; as claimed in claim 8:

comprising the further steps of:

creating the cone of light by directing the collimated light through a lens system.

* * * * *